Oct. 15, 1929.   C. R. ROCHE   1,731,590
GAS ENGINE
Original Filed Feb. 19, 1925   4 Sheets-Sheet 1

Inventor
Clifton R. Roche
By Lyon & Lyon
Attorneys

Oct. 15, 1929.  C. R. ROCHE  1,731,590
GAS ENGINE
Original Filed Feb. 19, 1925    4 Sheets-Sheet 2
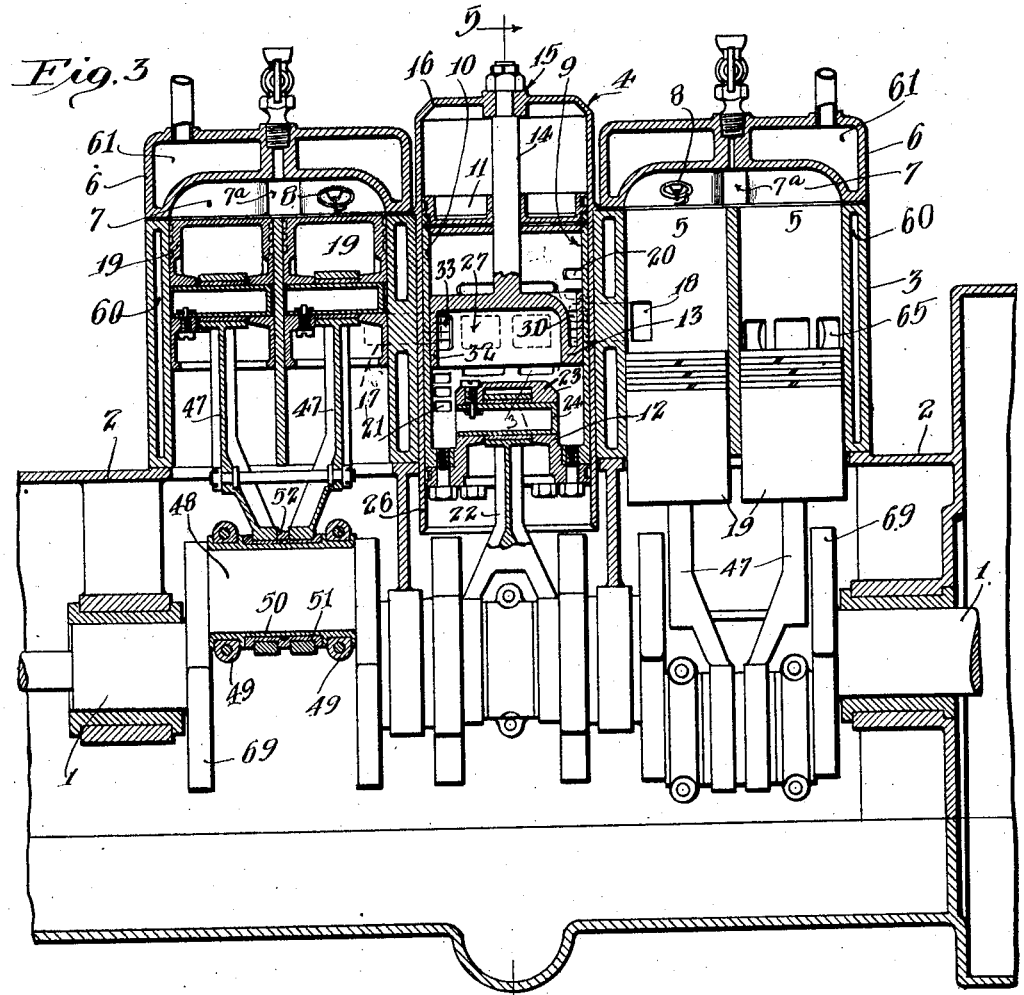
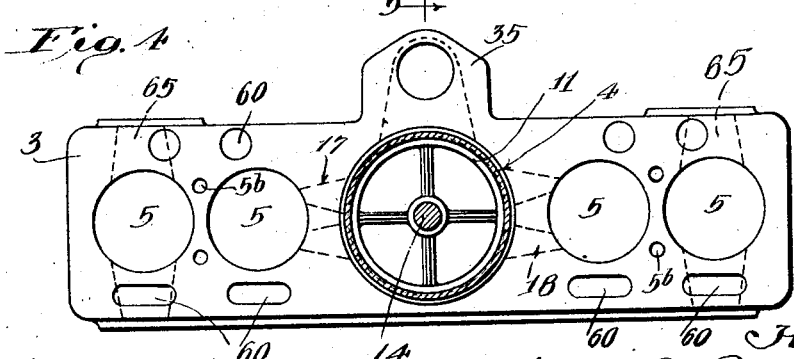

Oct. 15, 1929.  C. R. ROCHE  1,731,590
GAS ENGINE
Original Filed Feb. 19, 1925  4 Sheets-Sheet 3

Inventor
Clifton R. Roche
By Lyon & Lyon
Attorneys

Oct. 15, 1929.                C. R. ROCHE                 1,731,590
                               GAS ENGINE
                Original Filed Feb. 19, 1925    4 Sheets-Sheet 4
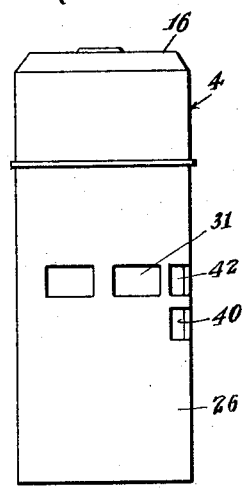
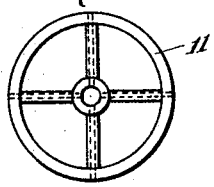
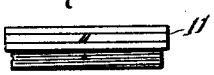
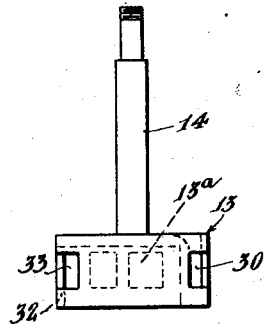
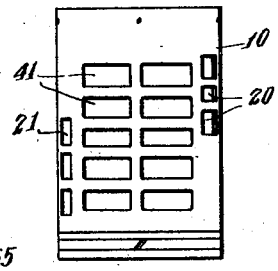
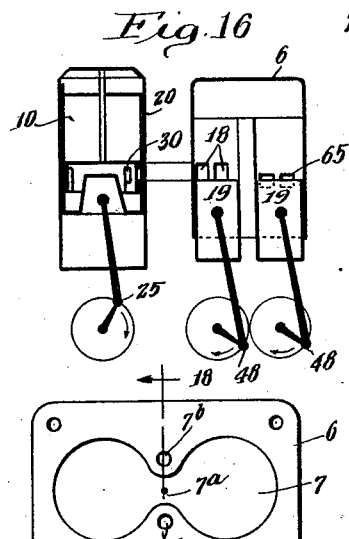
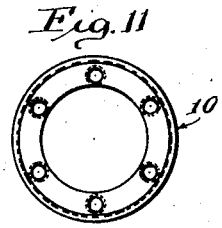
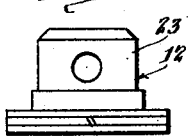
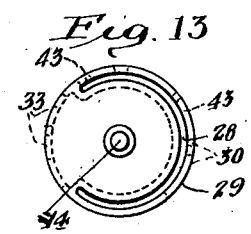
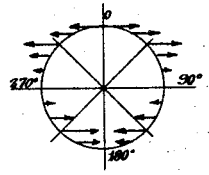
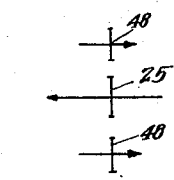
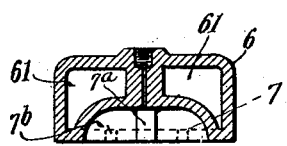
Inventor
Clifton R. Roche
By Lyon & Lyon
Attorneys Patented Oct. 15, 1929

1,731,590

UNITED STATES PATENT OFFICE

CLIFTON R. ROCHE, OF LOS ANGELES, CALIFORNIA, ASSIGNOR OF ONE-HALF TO H. A. BRUNELL, OF LOS ANGELES, CALIFORNIA

GAS ENGINE

Application filed February 19, 1925, Serial No. 10,323. Renewed March 27, 1929.

This invention relates to gas engines. In the operation of an ordinary four-cycle gas engine, the power of which is controlled by an ordinary throttle, the efficiency of the engine becomes relatively low when the engine is throttled down, on account of the fact that the compression in the cylinders becomes decreased. That type of engine is also lacking in flexibility as to design, and it is not possible to adapt the engine, without substantial changes in design, to produce engines of different horsepower ratings. The general object of this invention is to produce a gas engine which will operate at different speeds economically, and which will have a relatively wide range of horsepower; also to provide an engine which will operate with a substantially constant compression. One of the objects of my invention is to produce an engine which is dynamically balanced, thereby reducing the vibration and wear and tear of the engine.

A further object of the invention is to provide a two-cycle engine which will give sufficient impulses at each revolution to run with a reduced amount of vibration, and which can be constructed without the use of poppet valves, thereby rendering the engine a silent engine; and to produce an engine in which relatively large bearing areas can be provided for the connecting rods though they are attached to the crank pins in common; also to provide improved means for cooling the cylinder walls and for enabling the engine to run idle readily on a small charge.

A further object of the invention is to provide a simple and compact engine of this type having few parts, and which has a construction adapting it readily for being designed in units which can be increased as desired, to increase the horsepower of the engine.

Further objects of the invention will appear hereinafter.

The invention consists in the novel parts and combination of parts to be described hereinafter, all of which contribute to produce an efficient gas engine.

A preferred embodiment of the invention is described in the following specification, while the broad scope of the invention is pointed out in the appended claims.

In the drawings:

Fig. 3 is a longitudinal section through a unit of the engine, taken on the line 3—3 of Fig. 1.

Fig. 4 is a plan of one of the cylinder blocks partly in section.

Fig. 6 is a side elevation of a charging cylinder which is a feature of this invention.

Fig. 7 is a side elevation showing the details of a sleeve which constitutes a feature of the invention.

Fig. 8 is a side elevation of the detachable head which may be used to close the upper end of the sleeve shown in Fig. 7.

Fig. 9 is a plan of the detachable head shown in Fig. 8.

Fig. 10 is a side elevation of the inner head for the sleeve shown in Fig. 7.

Fig. 11 is a plan of the sleeve shown in Fig. 7.

Fig. 12 is a side elevation showing the details of a fixed head which I employ to cooperate with the sleeve shown in Fig. 7.

Fig. 13 is a top plan view of the fixed head shown in Fig. 12.

Fig. 14 is a diagram illustrating some of the dynamic forces arising during the rotation of the engine.

Fig. 15 is also a diagram indicating how the dynamic forces are balanced.

Fig. 16 is a diagram illustrating the cooperation of the charging cylinder and power cylinders.

Fig. 17 is a bottom plan of the common head for a pair of power cylinders.

Fig. 18 is a vertical cross section through this head taken on the line 18—18.

Figure 2:
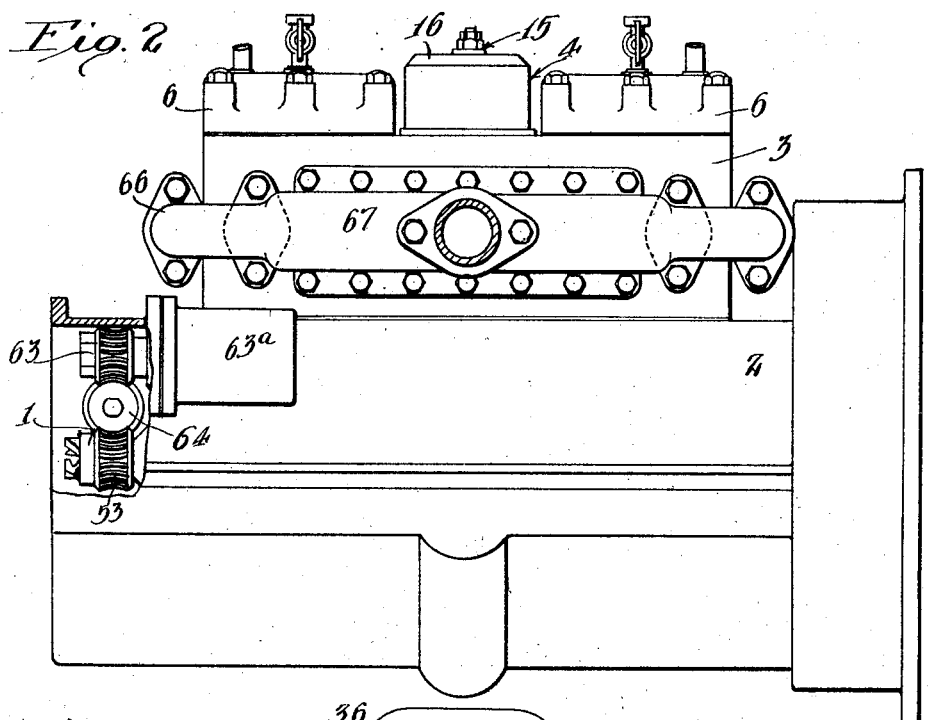
Fig. 2 is a side elevation projected on a plane indicated by the line 2—2 of Fig. 1.

In practising this invention, the engine is preferably constructed in units, each unit comprising power cylinders and a charging cylinder, the function of the charging cylinder being to deliver charges of explosive mixture which are directed into the power cylinders and exploded therein. In practice, I prefer to construct each unit with two sets of power cylinders between which the charging cylinder is disposed. If desired, there can be one power cylinder on each side of the charging cylinder, but I prefer to employ as a unit a set of power cylinders disposed toward each end of the cylinder block, each set consisting of two cylinders of equal diameter and arranged with the charging cylinder disposed between the two sets of power cylinders. I also prefer to place the cranks for the power cylinders substantially 180° apart, and in the type of engine described in the following specification, the pistons of each set of power cylinders are attached to the same crank so that each set of power cylinders actually operates as a multiple piston cylinder. The gases of combustion are scavenged from the cylinders by the incoming slightly compressed explosive charge. The charging cylinder is preferably double-acting so that it expels a charge on the in stroke as well as on the out stroke, and these charges are directed alternately into the two sets of power cylinders, the flow to the power cylinders being preferably positively controlled by valve means associated with or forming a part of the charging cylinder.

I shall now describe the invention as embodied in the engine illustrated in the accompanying drawings:

The engine illustrated is a V-type, that is to say, it is composed of two engine units, the cylinder axes for one unit being disposed in a plane at right angles to the plane of the cylinder axes for the other unit, with the pistons of both units connecting to a common engine shaft 1, which is mounted in a suitable crank case 2 (see Fig. 3); all of the cylinders of one unit are preferably disposed in a single cylinder block 3.

Between the sets of power cylinders the charging cylinder 4 is located. In the present instance, each set of power cylinders consists of two cylinders 5 disposed toward the end of the cylinder block, and having bores of equal diameter, with a common head 6, on the inner side of which a combustion chamber 7 is provided; the wall of this combustion chamber may be provided with ignition means such as spark plugs 8. The charging cylinder is constructed so that it is double-acting, and in order to accomplish this, I prefer to provide a reciprocating charging piston 9, which operates as a valve, and is in the form of a sleeve 10, the outer end of which is closed by a detachable head 11 and the inner end of which is closed by a detachable head 12.

Means is provided for admitting explosive mixture to the interior of the sleeve alternately above and below a fixed head 13, which is disposed about midway of the charging cylinder 4, said head being secured in position by a rod 14, which extends through the outer head 11 of the sleeve with its outer end secured at 15 to the outer head 16 of the charging cylinder.

In the operation of the engine, at each down stroke of the piston sleeve 10, a charge of explosive mixture is drawn into the lower end of the piston sleeve below the fixed head 13, and on the out stroke or up stroke this charge is slightly compressed, and is then directed over into one set of the power cylinders; on the out stroke of the sleeve a charge is drawn into the upper end of the sleeve above the fixed head 13, and on the down stroke this slightly compressed charge is directed into the other set of power cylinders. In order to accomplish this, the power cylinders are provided with a webbed admission port 17 (see Fig. 3) which serves the power cylinders at the left, and a webbed admission port 18, which serves the power cylinders at the right. These admission ports are located so that when the pistons 19 of the power cylinders are at the end of their in stroke, the admission ports will be near the bottom of the effective cylinder volume, that is to say, they will be just above the upper faces of the pistons. I prefer to locate these ports at this point so as to increase the effectiveness of the scavenging of the gases of combustion, which will be described more in detail hereinafter.

The flow of the charges from the charging cylinder is preferably controlled positively by valve means, for which purpose I provide the wall of the piston sleeve 10 with a series of webbed ports 20 which align with the admission port 18 at the proper time in the down stroke of the piston sleeve to assist in directing the charge over into the right hand set of power cylinders. The opposite side of the sleeve 10 is provided with similar ports 21 which cooperate in a similar way with the port 17 on the up stroke of the piston sleeve.

Figure 5:
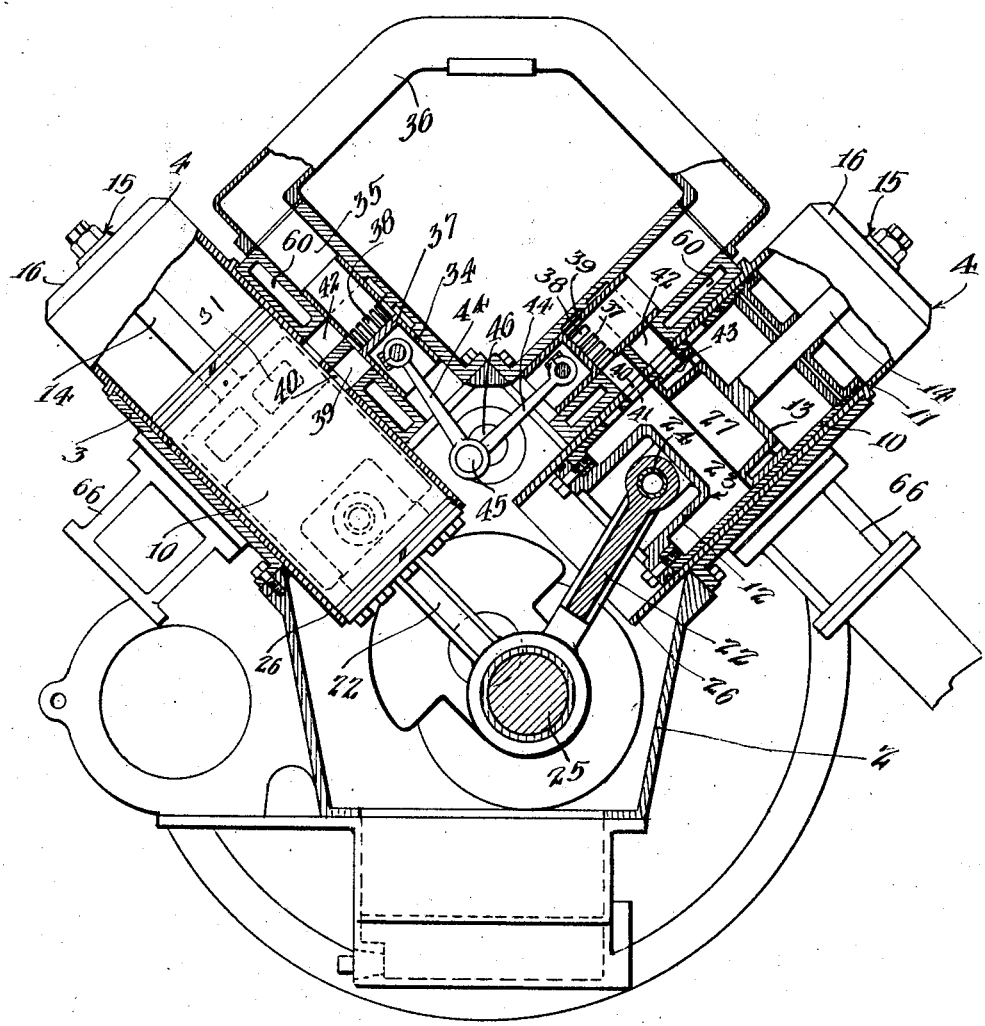
Fig. 5 is a vertical section taken on the line 5—5 of Fig. 3.

In order to increase the compactness of the engine and reduce cylinder height, I prefer to let the connecting rod 22 (which reciprocates the sleeve 10 from the crank shaft) extend up past the lower end of the sleeve 10; in other words, I construct the lower head 12 of the piston sleeve 9 with an upwardly extending abutment 23 which carries a wrist pin 24 with which the connecting rod 22 connects, the lower end of the connecting rod being attached to its proper crank pin 25 (see Fig. 5) so as to enable the sleeve-piston 9 to be reciprocated from the engine shaft. This sleeve-form piston 9 simply reciprocates in the cylindrical shell of the charging cylinder 4, and the lower end of the shell of the charging cylinder is in the form of a skirt 26 which projects down into the interior of the crank case.

On account of the abutment 23, it is necessary to provide the under side of the fixed head 13 with a central recess 27, (see Fig. 3) and as this head lies directly opposite to the ports 17 and 18 it is necessary to provide a special construction for the head 13 in order to enable the admission port 18 to communicate with the interior of the sleeve above the head 13. In order to accomplish this, I provide the upper side of the fixed head 13 with a circumferential recess 28 which is open on its upper side so that the recess communicates with the interior of the sleeve at this point, and this recess is formed within a circumferential apron 29 which extends around the greater portion of the periphery of this head. This apron 29 is provided with ports 30 (see Fig. 13) which are in alignment with the admission port 18 for the cylinder 5, which lies adjacent the charging cylinder and constitutes virtually an extension of these ports, in view of the fact that the head 13 is fixed. The shell of the charging cylinder 4 is also provided with ports 31 (see Fig. 6) which register with the port 18 (see Fig. 3). Between the shell of the charging cylinder 4 and the apron 29 the piston sleeve 10 slides. Hence, when the ports 20 are in register with the admission port 18, a charge in the upper end of the sleeve 10 will pass into the right hand set of power cylinders.

On the other side of the fixed head 13 the head has a downwardly projecting flange or apron 32 to provide a guiding surface for this side of the sleeve, and this apron is provided with ports 33 which are in alignment with the admission port 17 for the left set of power cylinders. On this side of the charging cylinder the piston sleeve slides between this apron 32 and the shell of the charging cylinder 4, and cooperates with the ports 17 and 33 to admit the charge into the left hand power cylinder set.

Suitable valve means is provided for controlling the admission of the explosive mixture to the charging cylinder; (see Fig. 5) hence the construction already described is merely a unit of an engine when constructed of the V-type arrangement of cylinders, the entire engine consisting of two units, that is to say, the cylinder mechanism already described and about to be described is duplicated on each side of the center line of the engine. This valve means is preferably in the form of a piston valve 34 which reciprocates in a valve-chest 35 formed as a projection on the inner side of the cylinder block (see Fig. 4). This piston valve is of tubular form and is open at its upper end, where it receives the explosive mixture flowing inwardly through an intake connection 36. The lower portion of the piston valve is closed by a transverse head 37 adjacent to which ports 38 are arranged circumferentially completely around the valve and capable of communicating with an annular inlet passage 39 which directs the explosive mixture through openings or port 40 in the side of the charging cylinder. These openings 40 always register with some one of a series of inlet ports 41 in the side of the sleeve 10, to admit the charge into the sleeve on the inner side of the fixed head 13. A similar annular port 42 is provided through the cylinder block and the wall of the charging cylinder for admitting the explosive mixture through ports 43 in the head 13 to admit to the outer side of the head 13.

The valve 34 is reciprocated so as to bring these ports 38 first in alignment with the port 40 and then in alignment with the port 42, so as to admit the explosive mixture alternately into the outer and inner ends of the charging cylinder. In order to reciprocate the piston in this way, it is provided with a connecting rod 44 attached to a crank-pin 45 on a special shaft 46. This pin 45 serves as a common crank pin for this connecting rod 44 and for the opposite connecting rod 44 which controls the piston valve of the other unit of the engine.

Figure 1:
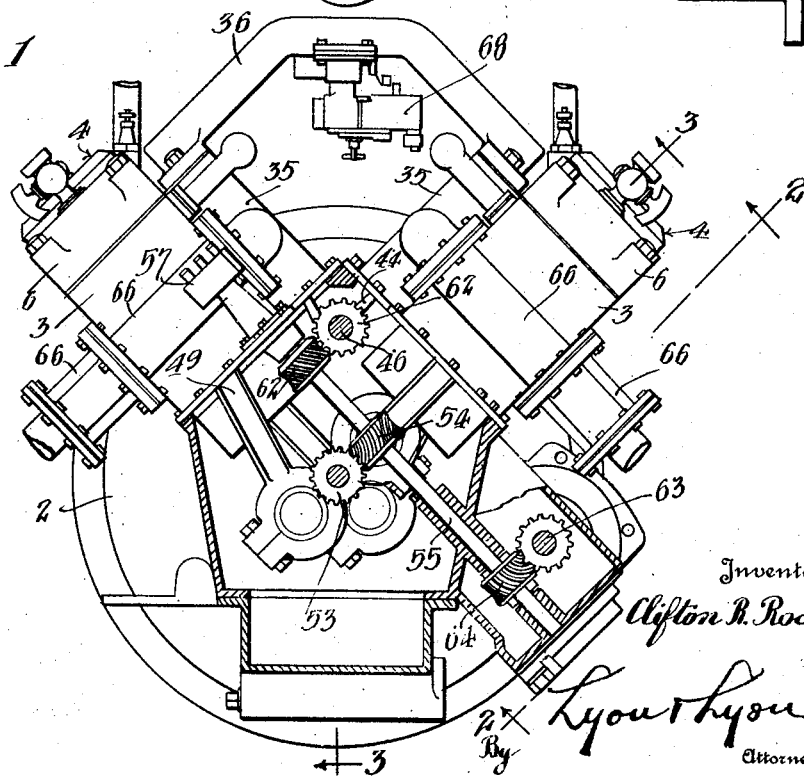
Fig. 1 is an end elevation of the engine, certain parts being broken away, to illustrate the general construction of the engine and also the driving connections for the working parts.

As already indicated, the connecting rods 47 which correspond to the power cylinders of one engine unit (see Fig. 3) attach to the same crank pins 48 as do the connecting rods 49 which correspond to the power cylinders of the other engine unit. I provide an improved construction for connecting these rods to the crank pins (see Fig. 3) which enables the wearing area to be considerably larger than would otherwise occur. In order to accomplish this, I provide the crank pin 48 with an inner bushing 50 which is loose upon the pin, lubricated, and which rotates on the pin as a bearing. The rods 49 from the left engine unit as viewed in Fig. 1 are rigidly secured to this inner bushing or sleeve. The middle portions of this bushing 50 carries a loose outer bushing 51 which is lubricated and which rocks on the inner bushing 50 as a bearing. The inner ends of the connecting rods 47 are offset inwardly (see Fig. 3) to bring them nearer together, and they are rigidly secured to this outer bushing 51. Between the inner ends of these connecting rods a distance rib 52 may be formed on the bushing. With this construction, it will be evident that a very considerable wearing area is provided for both sets of connecting rods.

Referring to Fig. 1, any suitable means is provided for driving the different counter shafts which may be necessary to operate the engine. In the present instance, I provide the end of the engine shaft 1 with a spiral gear 53 which meshes with a spiral gear 54 on a counter shaft 55. A pump, not illustrated, circulates water through the cylinder jackets 60 and through the jackets 61 of the heads. The construction for this purpose may be the same as commonly employed in ordinary gas engine construction.

Through spiral gears 62 the shaft 46 is driven, which carries the crank pin 45 for operating connecting rods 44 of the valves 34. The counter shaft 55 drives a timer 57, see Fig. 1. The timer, which is not illustrated in detail, may be of any common type to operate in the usual way to close and break the circuits through the spark plugs 8 at the proper times. A generator 63ª may be driven by a shaft 63, driven through spiral gears 64.

Referring to Figs. 3 and 4, I prefer to locate the exhaust ports 65 at the lower end of the outer power cylinders of each set so that when the pistons 19 are at the end of their in stroke, these exhaust ports 65 will be just above the pistons. These ports emerge from the cylinder block on the front and rear faces thereof (see Fig. 4). The exhaust ports which emerge on the inner faces are provided with connections 66 which lead around to the side of the engine and connect with the exhaust manifolds 67 (see Fig. 2).

When the explosive charge is admitted at the ports 17 or 18 into the power cylinders which are adjacent to the charging cylinder, they of course flow upwardly in these power cylinders and then pass through the combustion chambers 7 and thence downwardly in the outer or remote power cylinders; hence it will be seen that the exhaust ports 65 are disposed at the most remote point in the path of flow of the charge as it comes into the power cylinders. This gives an advantageous effect in scavenging these cylinders. The inlets 36 for the explosive mixture lead downwardly from a carburetor 68 (see Fig. 1).

An engine embodying this invention readily adapts itself to variations of design to suit different requirements; for example, if the engine is required to have relatively high horsepower for its weight, the charging cylinder would have a relatively large diameter so as to supply a relatively large charge to the power cylinders. On the other hand, if the horsepower of the engine was not required to be relatively high with respect to the weight of the engine, the diameter of the charging cylinder could be smaller. This gives the engine a very desirable flexibility in design, that is to say—by making slight changes in the charging cylinder design, the same engine block can be adapted for developing a wide range of horsepower in the completed engine. Furthermore, the engine always operates at a constant compression in the power cylinders and this makes for efficiency of operation and brings about a much more efficient effect than the effect which occurs in throttling an ordinary gas engine, because in the latter case the compression is reduced as the throttling is increased.

During the up stroke or out stroke of the sleeve piston 9, the space between the outer head 11 and the head 16 of the charging cylinder operates to produce a cushioning effect tending to overcome the inertia of the moving parts, due to the compression of the air or gases which may have accumulated in this chamber. On the down stroke, on the other hand, the air or gases in this space become very much rarefied, and this increases the relative value of the air pressure against the lower head 12 and this tends to absorb the inertia of these moving parts on the down stroke or in stroke.

As regards the balancing of the engine, it is a well known fact that when two weights are caused to reciprocate in straight lines 90° apart in the manner of the pistons of these two engine units, radially acting forces are developed, and also forces acting substantially at right angles to the vertical plane bisecting the right angle. These radial unbalanced primary forces which may be considered as concentrated on the journals, may be balanced by counterweights such as the counterweights 69 on the crank arms. In other words the radial balanced forces can be counter-balanced for each crank throw thus eliminating the vibration that would be caused by these forces. The other mentioned force which acts at right angles to a plane bisecting the 90° V at a certain point in the rotation of the crank, starts at 0 and reaches a maximum after a travel of approximately 45°; after travel of 90° this force becomes 0, and at 135° becomes a maximum again, but exerted in the opposite direction; at 180° this force again becomes 0 and at 225° becomes a maximum again exerted in the same direction as at the 45° position. At 270° this force becomes 0 and at 315° becomes a maximum again and exerted in the same direction as in the 135° position. From this point the force decreases to 0 as the crank again reaches the starting point. This operation of these forces is illustrated in Fig. 14, it being understood that each horizontal force really acts at the center of the crankshaft. The figure indicates diagrammatically the force for each angular position.

The crank pin 25 for the charging cylinder of each unit is disposed intermediately between the crank pins for the two sets of power cylinders, and is preferably in a substantially 90° position between these two crank pins. The effect of this is that when this unbalanced force is acting in a certain direction at one end of the engine unit, an equal force will be acting in the same direction at the other end of the engine unit. The fact that the crank of the charging cylinder is 90° between the cranks of the power cylinders develops a horizontal force acting in a direction opposite to these forces developed by the power cylinders.

According to my invention as regards the feature of balance, I provide a reciprocating weight to balance this force; in the present instance this weight is the reciprocating parts of the charging cylinder, and I give these parts of the charging cylinder just sufficient weight to balance these forces. In other words, the horizontal dynamic force developed by the charging piston should be twice the value of each of the other forces. This enables me to attain nearly perfect balance of these forces and reduces vibration to a minimum (see Fig. 15). This balancing principle may be applied to any V type of engine, for example, the ordinary four cycle type. The construction of my engine is such that the charging piston crank is in advance of the crank pin for the cylinders which it is to supply with explosive mixture, in other words, as applied to the construction illustrated in Fig. 3, the crank pin for the sleeve-piston 9 will be descending and 270° in advance of the crank pin for the right set of cylinders, so that when the charge has been slightly compressed it will be forced into these cylinders when their pistons start to rise at the beginning of their up stroke. This gives the proper cooperation for scavenging.

The combustion chamber 7 is in the form of two enlarged pockets connected by a constricted neck or passage 7$^a$ (see Fig. 17). This enables water circulation openings 7$^b$ to be provided which are very close to the longitudinal plane of the cylinders and which communicate with corresponding openings 5$^b$ in the cylinder block. The water circulating through these openings 7$^b$ therefore can be circulated through the water jacket of the cylinder relatively near a point in the common wall of each pair of power cylinders where they unite. This is very advantageous, as they are liable to overheat at this point. Furthermore, this shape of combustion chamber including the constricted passage 7$^a$ is favorable to easy running of the engine when idling because the relatively small explosive charge is more walled about within the inner cylinder of the pair and confined against mixing with the exploded gases in the outer cylinder which carries the exhaust ports.

The mode of operation of the engine will be now briefly stated: The explosive mixture is drawn in through the carburetor 68 and passes down the branch pipes 36 which lead the mixture into the valve chest 35. At this point the admission is controlled by the valves admitting the charges through the sleeve of the charging cylinder and admit the charges alternately above and below the fixed head 13 within the sleeve 10. On each in stroke of the sleeve 10 the charge is slightly compressed and flows into the right hand set of power cylinders (see Fig. 3) and on the opposite stroke of the sleeve 10 the charge flows into the left hand set of power cylinders. The charge is admitted just after the pistons 19 of the power cylinders have uncovered the exhaust ports 65 so that the incoming charge scavenges the cylinders, driving out the gases of combustion as it advances. On the upstroke of the power pistons the charge is compressed and then the ignition of the charges is effected in the usual way. When the sleeve piston 9 has drawn in a charge and starts its in-stroke preparatory to forcing the charge into one of the power cylinders the charge cannot be forced back into the intake 36 because the piston valve 34 will have closed the ports from the valve chest. And furthermore on the out-stroke or up-stroke of the power cylinder the port leading into the power cylinder from the charging cylinder will be closed by the power cylinder piston.

The engine operates with constant compression because compression in every up-stroke begins at atmospheric pressure as soon as the exhaust port is closed when the up-stroke begins. If the engine is throttled down, the incoming charge has insufficient volume to expel the burnt gases, but as this charge will be compressed in presence of the spark plug the charge will be fired and will not be interfered with by the last burnt charge in the cylinder.

In the operation of the engine the sleeve 10 cuts off communication between the power cylinders and the charging cylinder until after the exhaust ports have been opened, and also operates to allow the charge to flow from the charging cylinder into the power cylinders after the exhaust ports have been closed on the upstroke. This will be evident from an inspection of Fig. 16.

What I claim is:

1. In a gas engine, the combination of a pair of power cylinders, a charging cylinder, a crank shaft with a crank corresponding to each power cylinder, pistons operating in their respective power cylinders, connecting rods connecting the same respectively with their corresponding cranks, said charging cylinder having a charging piston driven from the shaft, in the form of a sleeve with a head at each end, a fixed head within the sleeve, means for admitting the charge to the interior of the sleeve on opposite sides of the fixed head, said fixed head cooperating with the heads of the sleeve to expel a charge on each stroke of the sleeve, and means for admitting the charges alternately to the power cylinders.

2. In a gas engine, the combination of a pair of power cylinders, a charging cylinder, a crank shaft with a crank corresponding to each power cylinder, pistons operating in their respective power cylinders, connecting rods connecting the same respectively with their corresponding cranks, said charging cylinder having a charging piston driven from the shaft in the form of a sleeve with a head at each end, a fixed head within the sleeve, means for admitting the charge to the interior of the sleeve on opposite sides of the fixed head, said fixed head cooperating with the heads of the sleeve to expel a charge on each stroke of the sleeve, said sleeve having ports toward one end thereof corresponding to one of the power cylinders and having ports toward the other end thereof corresponding to the other power cylinder, one of said power cylinders having an admission port corresponding to one of said ports, and the other power cylinder having an admission port corresponding to the other of said ports for admitting the explosive charges to the power cylinders alternately.

3. In a gas engine, the combination of a pair of power cylinders, a charging cylinder, a crank shaft with a crank corresponding to each power cylinder, with the crank for one power cylinder disposed substantially 180° from the crank for the other power cylinder, pistons operating in their respective power cylinders, connecting rods connecting the same respectively with their corresponding cranks, said charging cylinder having a reciprocating piston, a charging crank on the shaft for driving the charging piston and disposed substantially 90° from the first named cranks, means for admitting the charge to the charging cylinder, said charging cylinder having means cooperating with the charging piston for receiving a charge on each outstroke and on each instroke, and having means for admitting the charges alternately to the power cylinders.

4. In a gas engine, the combination of a pair of power cylinders, a charging cylinder, a crank shaft with a crank corresponding to each power cylinder, with the crank for one power cylinder disposed substantially 180° from the crank for the other power cylinder, pistons operating in their respective power cylinders, connecting rods connecting the same respectively with their corresponding cranks, said charging cylinder having a reciprocating piston, a charging crank on the shaft for driving the charging piston and disposed between and in angular position substantially 90° from the first named cranks, means for admitting the charge to the charging cylinder, said charging cylinder having means cooperating with the charging piston for receiving a charge on each outstroke and on each instroke, and having valve means in the form of a sleeve with ports for admitting the charges to the charging cylinder and from the charging cylinder to the power cylinder alternately to the power cylinders.

5. In a gas engine, the combination of a pair of power cylinders, a charging cylinder disposed between the power cylinders, a crank shaft with a crank corresponding to each power cylinder, pistons operating in their respective power cylinders, connecting rods connecting the same respectively with their corresponding cranks, said charging cylinder having a piston driven from the shaft, means for admitting the explosive mixture to the charging cylinder, said charging cylinder having a charging piston including a sleeve with ports enabling the charging cylinder to receive a charge on each outstroke and on each instroke of the charging piston, and means including ports in the said sleeve, and ports leading from the charging cylinder to the power cylinders for admitting the charges alternately to the power cylinders.

6. In a gas engine, the combination of a pair of power cylinders, a charging cylinder, a crank shaft with a crank corresponding to each power cylinder, pistons operating in their respective power cylinders, connecting rods connecting the same respectively with their corresponding cranks, said charging cylinder having a charging piston driven from the shaft, in the form of a sleeve with a head at each end, a fixed head within the sleeve, automatically controlled valve ports for admitting the charge to the interior of the sleeve alternately on opposite sides of the fixed head, said fixed head cooperating with the heads of the sleeve to expel a charge on each stroke of the sleeve, and means for admitting the charges alternately to the power cylinders.

7. In a gas engine, the combination of a pair of power cylinders, a charging cylinder, a crank shaft with a crank corresponding to each power cylinder, pistons operating in their respective power cylinders, connecting rods connecting the same respectively with their corresponding cranks, said charging cylinder having a charging piston driven from the shaft, said charging cylinder having a piston in the form of a sleeve with a head at each end and with a fixed head within the sleeve, an automatic reciprocating piston valve operating to admit the charge to the interior of the sleeve alternately on opposite sides of the fixed head, said fixed head cooperating with the heads of the sleeve to expel a charge on each stroke of the sleeve, said charging cylinder having ports communicating respectively with the power cylinders, and said sleeve having ports cooperating with the last named ports to admit the expelled charges alternately to the power cylinders.

8. In a gas engine, the combination of a pair of power cylinders, a charging cylinder, a crank-shaft with connecting rods corresponding to the power cylinders, said charging cylinder having a piston in the form of a sleeve with a head at each end and driven from the shaft, a fixed head within the sleeve, a valve-chest for receiving the explosive mixture, a port leading from the valve-chest to communicate with the interior of the sleeve on one side of the head, another port leading from the valve-chest to communicate with the interior of the sleeve on the other side of the fixed head, said sleeve having ports to cooperate with the last named ports to admit explosive mixture from the valve-chest to the interior of the sleeve, and a piston valve reciprocating in the valve-chest and having ports for alternately opening communication from the valve-chest through the said first named ports.

9. In a gas engine, the combination of a cylinder having a set of power cylinders toward one end and a set of power cylinders toward its other end with a charging cylinder disposed between and serving both the sets of power cylinders, means for receiving and expelling explosive charges from the charging cylinder, said block having ports leading from the charging cylinder to the adjacent power cylinders and having exhaust ports only in the outer power cylinders leading from the outer power cylinders to the inner and outer side faces of the block, the power cylinders of each set being in communication with each other, and an exhaust manifold connecting with the exhaust ports, said block having a valve-chest on its side with a reciprocating valve for controlling flow of the explosive mixture into the charging cylinder.

10. In a gas engine, the combination of a pair of power cylinders, a charging cylinder, a crank shaft with a crank corresponding to each power cylinder, pistons operating in their respective power cylinders with connecting rods connecting the same respectively with their corresponding cranks, said charging cylinder having a piston driven from the shaft in the form of a sleeve, said charging cylinder also having an outer head and a fixed head disposed within the sleeve, said sleeve having a head at each end and cooperating with the fixed head to expel an explosive charge on each stroke of the charging piston, said cylinders having admission ports for the expelled charges, and said sleeve having ports to cooperate therewith to admit the expelled charges alternately to the power cylinders, said charging cylinder having a chamber between the said outer head thereof and the outer head of the sleeve operating to cushion the upward movement of the sleeve and thereby balance the inertia of the sleeve at the end of its outstroke.

11. In a gas engine, the combination of a pair of power cylinders, a charging cylinder, a crank shaft with a crank corresponding to each power cylinder, pistons operating in their respective power cylinders with connecting rods connecting the same respectively with their corresponding cranks, a charging piston driven from the shaft reciprocating in the charging cylinder and constructed in the form of a sleeve with a head at each end, a fixed head carried within the sleeve and cooperating therewith to receive and expel an explosive charge on each stroke, said fixed head having a central recess on its inner side, and having a circumferential recess on its outer side communicating with the interior of the sleeve on the outer side of the fixed head whereby a circumferential apron is formed on the fixed head in contact with the inner face of the sleeve, said apron and the adjacent power cylinder having aligning ports to direct the expelled charge from the outer end of the charging cylinder into the power cylinder on one side, the other power cylinder having ports to communicate with the inner end of the sleeve on the inner side of the fixed head to direct the charge into that cylinder, said sleeve having ports in the wall thereof for controlling the flow of the charges through the said admission ports for the power cylinders.

12. In a gas engine, the combination of a pair of power cylinders, a charging cylinder, a crank shaft with a crank corresponding to each power cylinder, pistons operating in their respective power cylinders with connecting rods connecting the same respectively with their corresponding cranks, a charging piston driven from the shaft reciprocating in the charging cylinder and constructed in the form of a sleeve with a head at each end, a fixed head carried within the sleeve and cooperating therewith to receive and expel an explosive charge on each stroke, said fixed head having a central recess on its inner side, and having a circumferential recess on its outer side communicating with the interior of the sleeve on the outer side of the fixed head whereby a circumferential apron is formed on the fixed head in contact with the inner face of the sleeve, said apron and the adjacent power cylinder having aligning ports to direct the expelled charge from the outer end of the charging cylinder into the power cylinder on one side, the other power cylinder having ports to communicate with the inner end of the sleeve on the inner side of the fixed head to direct the charge into that cylinder, said sleeve having ports in the wall thereof for controlling the flow of the charges through the said admission ports for the power cylinders, the inner head of the sleeve having an abutment to extend up into the said central recess with a wrist pin extending through it, and a connecting rod attached to the wrist pin and connecting the same with the crank shaft to drive the sleeve therefrom.

13. In a V-type balanced gas engine, the combination of a crank shaft, a power unit with power cylinders with their axes in a plane inclined to the vertical central plane passing through the shaft, a second power unit with power cylinders with their axes in a plane inclined to the vertical central plane passing through the shaft, each power unit having its power cylinders disposed with a pair of power cylinders toward each end, said crank shaft having a pair of cranks disposed substantially 180° apart, each crank having a crank pin common to the two power units, each power unit having connecting rods corresponding respectively to the pairs of power cylinders connecting to the crank pins, said crank shaft having a crank between the first named cranks and disposed substantially at an angle of 90° with the same, and a reciprocating weight in each power unit connected to the last named crank for balancing the pistons and connecting rods of the power units.

14. In a V-type balanced gas engine, the combination of a crank shaft, a power unit with power cylinders with their axes in a plane inclined to the vertical central plane passing through the shaft, a second power unit with power cylinders with their axes in a plane inclined to the vertical central plane passing through the shaft, the said power cylinders of each power unit being disposed in pairs with a pair toward each end, said crank shaft having a pair of cranks disposed substantially 180° apart, each crank having a crank pin common to the two power units, each power unit having power pistons with connecting rods connecting to the crank pins, said crank shaft having a crank between the first named cranks and disposed substantially at an angle of 90° with the same, and a charging cylinder with a charging piston corresponding to each power unit with connecting rods connecting the charging pistons with the last named crank, said charging pistons with their connecting rods operating to balance the power pistons and their connecting rods.

15. In a gas engine, the combination of a pair of power cylinders having a common head with a combustion chamber, pistons reciprocating in said cylinders, a charging means with valve means associated with the charging means to allow the charge in the charging means to flow into the power cylinders, an exhaust port for the power cylinders disposed near the inner end of the power cylinders so as to be uncovered toward the end of the down stroke, said valve means operating to cut off communication between the power cylinders and the charging means until after the exhaust ports have been opened, and to allow the charge to flow from the charging means to the power cylinders after the exhaust ports have been closed on the upstroke.

16. In a V-type motor, the combination of a crank-shaft with three cranks, the second crank from the end of the shaft being disposed 90° from the end crank, and the third crank being disposed 180° from the end crank, a set of connecting rods attached to said cranks with reciprocating weights attached to the connecting rods reciprocating in a radial plane from the shaft, and a second set of connecting rods with reciprocating weights attached to said cranks and reciprocating in a radial plane from the shaft disposed substantially 90° from the first named radial plane.

17. In a V-type motor, the combination of a crank-shaft with three cranks, the second crank from the end of the shaft being disposed 90° from the end crank, and the third crank being disposed 180° from the end crank, a set of connecting rods attached to said cranks with reciprocating weights attached to the connecting rods reciprocating in a radial plane from the shaft, and a second set of connecting rods with reciprocating weights attached to said cranks and reciprocating in a radial plane from the shaft disposed substantially 90° from the first named radial plane, and counterbalances attached to the crank shaft.

18. In a gas engine, the combination of a pair of power cylinders with an exhaust port in the outer power cylinder only, pistons mounted to reciprocate in unison therein, a common combustion chamber for said cylinders with ignition means, charging means and an admission port for admitting an explosive charge through the side wall of the inner power cylinder above its piston before the same has reached the end of its instroke, whereby the explosive charge scavenges the cylinders, said admission port being located nearer the cylinder head than the exhaust port whereby the charging means continues to force in the charge after the exhaust port has closed.

Signed at Los Angeles, California, this 11th day of February, 1925.

CLIFTON R. ROCHE.